March 29, 1966 E. R. SPRINGER 3,242,685
ICE MAKING MACHINE
Filed Oct. 21, 1965 5 Sheets-Sheet 2

Fig. 2.

INVENTOR
EDWARD R. SPRINGER
BY Rommel, Alluxine & Rommel
ATTORNEYS

March 29, 1966  E. R. SPRINGER  3,242,685
ICE MAKING MACHINE
Filed Oct. 21, 1965   5 Sheets-Sheet 3

INVENTOR
EDWARD R. SPRINGER
BY Rommel, Allwein & Rommel
ATTORNEYS

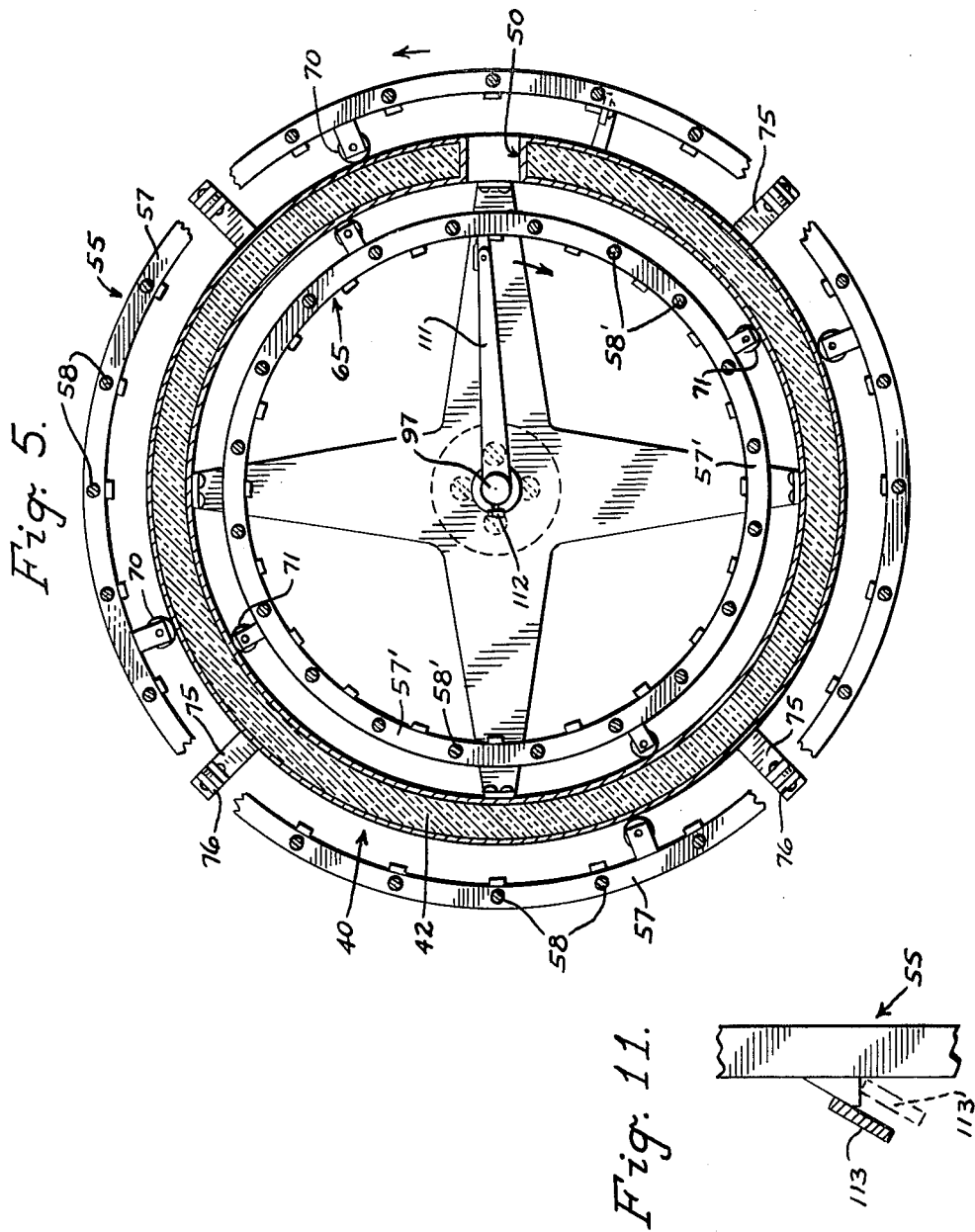

March 29, 1966    E. R. SPRINGER    3,242,685
ICE MAKING MACHINE
Filed Oct. 21, 1965    5 Sheets-Sheet 5
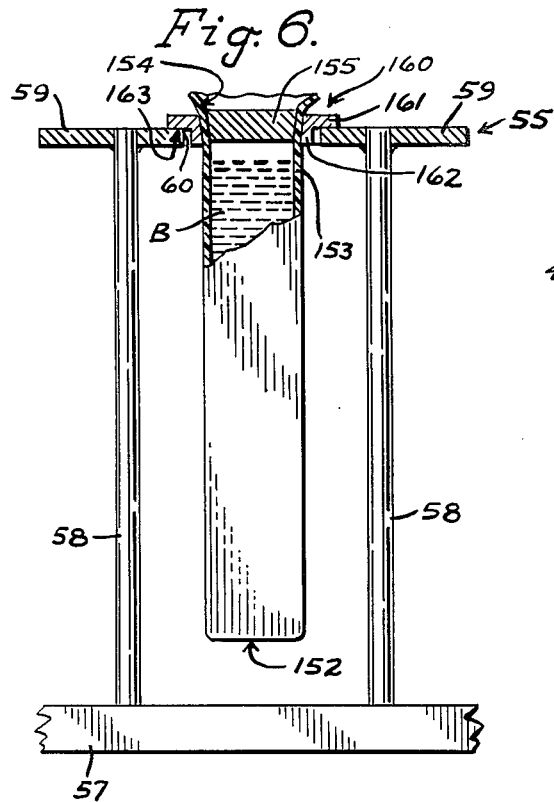
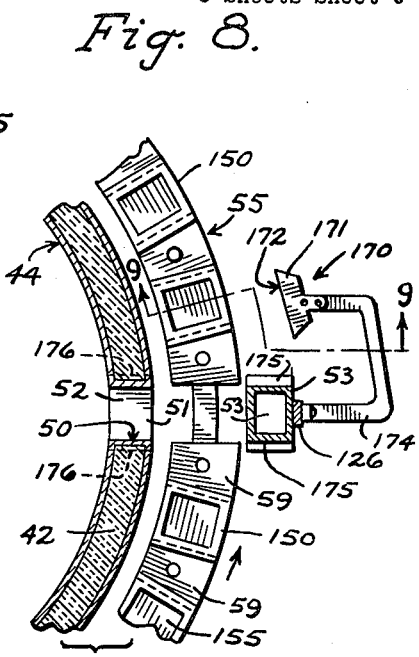
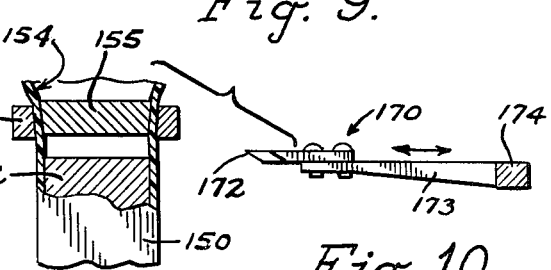
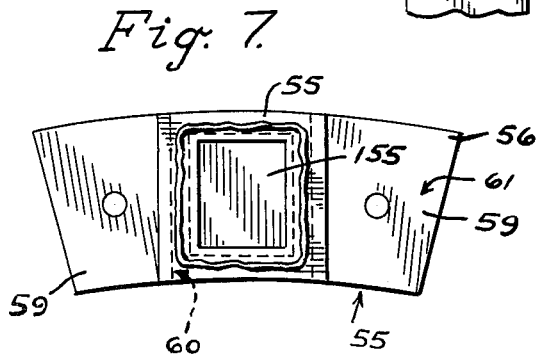
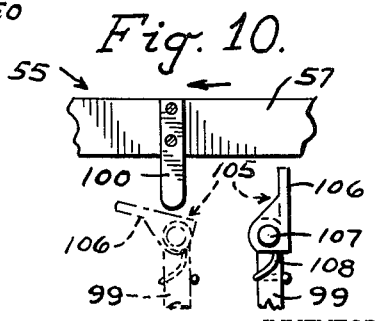
INVENTOR
EDWARD R. SPRINGER
BY Rommel, Alwine and Rommel
ATTORNEYS United States Patent Office 3,242,685
Patented Mar. 29, 1966

3,242,685
ICE MAKING MACHINE
Edward R. Springer, 619 N St., Aurora, Nebr.
Filed Oct. 21, 1965, Ser. No. 499,268
15 Claims. (Cl. 62—66)

This invention relates to machines and methods for processing unts of freezable materials into units of frozen materials. One example of a unit of freezable material is a receptacle-contained volume of water to be frozen into a unit of ice.

Important objects of the invention are: (1) to provide machines for the continuous freezing of the confined units of freezable materials into units of frozen materials by conveying the units of freezable materials to a closure-covered mouth of a freezing zone, opening the mouth and passing the units of freezable material into the zone for freezing, discharging the frozen material units from the mouth upon reopening of the mouth, one after another, with a unit of freezable material introduced through the mouth and into the freezing zone, in an interval between the ejection of two frozen material units; (2) to provide machines as detailed above, in which the closure for the mouth of the freezing zone provides means for the moving of the units of freezable material from the conveyors thereof into and out of the freezing zone; (3) to provide machines as referred to in the above paragraphs, which convey the frozen materials, still in the receptacles in which they have been frozen, in a confined storage and check-controlled discharge zone; (4) machines whereby the purchaser and/or user receives a frozen unit without it having been touched by the hands of the machine operator; (5) to provide machines as referred to above which insure but slight loss of freezing medium, since the unfrozen and the frozen materials are introduced and discharged from the same mouth of the freezing zone, and in a quickly-moving succession; (6) to provide machines of the kind stated above, which require the normally partial attention of only one operator at most in order to charge the receptacles of freezable material and detachably secure them to an outermost conveyor means forming a part of the machine; (7) to provide compact machines for freezing materials which require only a minimum of floor space; (8) to provide a machine for the purpose stated above, the operation of which may be learned quickly and is not complicated; and (9) to provide a method for the freezing of units of freezable material.

Other objects and advantages of the invention will be apparent during the course of the following detailed description taken in connection with the accompanying drawings, forming portions of this disclosure, and in which drawings:

FIG. 2 is a longitudinal vertical sectional view thereof;

FIG. 5 is an enlarged horizontal sectional view substantially on the line 5—5 of FIG. 2;

FIG. 6 is an enlarged view, partly in elevation and partly in vertical section, of a receptacle for material to be frozen;

FIG. 7 is a top plan view of the receptacle and associated structure of FIG. 6;

FIG. 8 is a fragmentary horizontal sectional view of receptacle transfer means;

FIG. 9 is a fragmentary horizontal sectional view substantially on the line 9—9 of FIG. 8, showing receptacle serving means;

FIG. 10 is a fragmentary vertical sectional view substantially on the line 10—10 of FIG. 2, showing rotating means for one conveyor;

FIG. 11 is a fragmentary horizontal sectional view substantially on the line 11—11 of FIG. 2, showing rotating means for the second conveyor.

Figure 1:
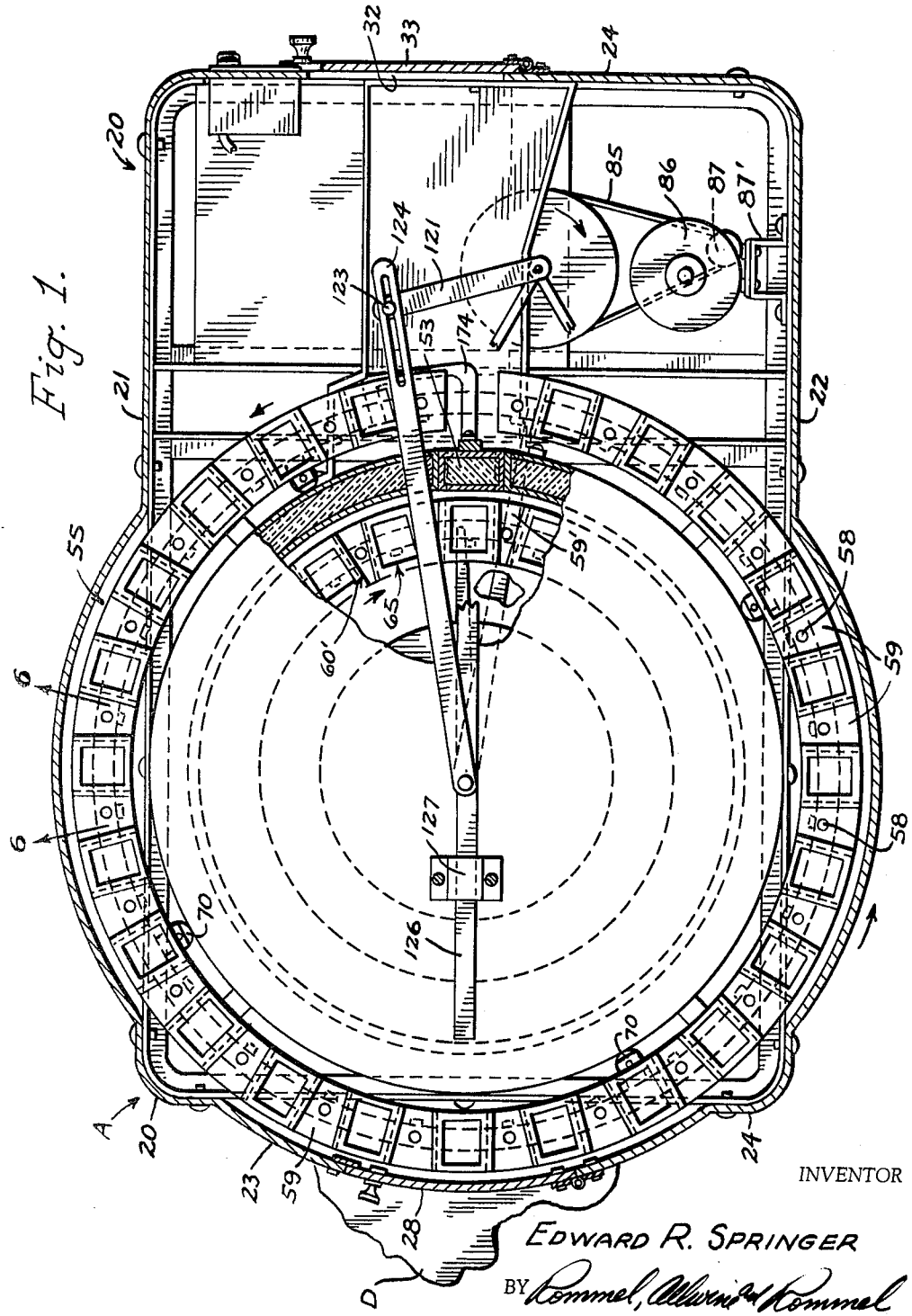
FIG. 1 is a horizontal sectional view of an example of the machine of this invention.

In the drawings, wherein for the purpose of illustration is shown a preferred embodiment of the machine for freezing freezable materials, and wherein similar reference characters designate corresponding parts throughout the several views, the letter A generally designates the machine; B, freezable material; and C, frozen material produced by the machine and the method; D, a station occupied by an operator.

The machine A preferably includes an outer housing or support 20 which comprises side walls 21 and 22, end walls 23 and 24, with the wall 24 being the front wall, a bottom wall 25 and top wall 26, suitably joined together as by the walls 21 to 24 and 26 being integrally united and attached to define a compartment or housing zone 27. Portions of the walls 21, 22 and 23 may be arcuate as shown in FIG. 1 in order to accommodate portions of the interior structure and provided with an opening, such as the opening 28 (FIGS. 1 and 2) in the wall 23 which admits the filled receptacles, to be subsequently described, and may be closed by a door 29. This opening fronts on the station D where an operator may be stationed in order to fill and introduce the filled containers, as will be subsequently described. Another opening 30 (FIG. 3) in the front wall 24 is provided for ingress to the check-receiving means of the machine (to be referred to subsequently), closed by a door 31 and an opening 32 with door 33 disposed below and spaced from the opening 30 for access to a discharge compartment or zone 24 whereupon opening of the door 33 will permit the withdrawal of a unit of frozen material C, as will be more fully described below.

Carried by and housed within the outer housing or support 20 are heat-insulating walls 40, comprising a bottom wall 41, upstanding wall 42 and top wall 43, defining a freezing compartment or zone 44. The wall 41 is preferably cylindrical, and the walls 41, 42 and 43 are spaced from the walls 20 to 26. The bottom and upstanding walls 41 and 42 may be integrally united and the top wall 43 being separate, but associated therewith in a conventional sealing relation.

The upstanding wall 42 is provided with a passageway 50 therethrough, with an outer mouth 51 and inner mouth 52, and the passageway slidably closed by combined closure and pusher means, consisting of a substantially horizontally reciprocating closure or door 53, best shown in FIGS. 1 and 8. In fact, the closure 53 has dual functions, since it also functions as a pusher and puller for pushing the receptacles 100, containing freezable material B, one by one, through the outer mouth 51, passageway 50 and inner mouth 52, into the freezing compartment or zone 44 and for pulling the receptacles 100, one by one, from the conveyor in the freezing zone through the inner mouth 52, passageway 50 and from the outer mouth 51 and onto the conveyor 55, to be next described. The door or closure 53 is provided with a narrow bore or slot 54 to be later referred to in detail.

A first supporting surface is provided by a substantially horizontally-disposed ring-shaped outer conveyor 55 which encircles the upstanding wall 42, as best shown in FIG. 1 and also in FIG. 5, where, however, it is broken away in several places in order to reveal structure therebeneath. The conveyor 55 is spaced from the wall 42.

The outer conveyor 55 comprises an upper horizontally-disposed composite portion 56 and lower horizontally-disposed ring-shaped portion 57 spaced apart but joined together by spaced apart, preferably cylindrical, rigid uprights 58. The composite portion 56 is composed of a plurality of spaced-apart horizontally-disposed segmental sections 59 which define, at the facing end faces thereof, openings 60 for slidably accommodating the receptacles 150 and their support means 160, subsequently described. The upper faces 61 of the segments 59 provide surfaces for slidably carrying the support means 160.

A second supporting surface is provided by a second horizontally-disposed conveyor 65 disposed within the freezing compartment or zone 44. This inner conveyor 65 faces the inner surface of the upstanding wall 42 and is spaced therefrom as may be seen in FIGS. 2 and 5. It is preferably like the outer conveyor 55 although, of course, of less diameter, but comprises an upper composite portion 56′ comprised of spaced apart segmental sections 59′ somewhat less in arc than the segments 59, a lower ring-shaped portion 57′ and spaced apart uprights 58′ joining the upper segmental sections 59′ to the lower ring-shaped portion 57′ with openings 60′ between the end faces of the segments for the same purpose as the openings 60, and the upper faces of the segment sections 59′ also provide surfaces for slidably carrying the support means.

Figure 4:
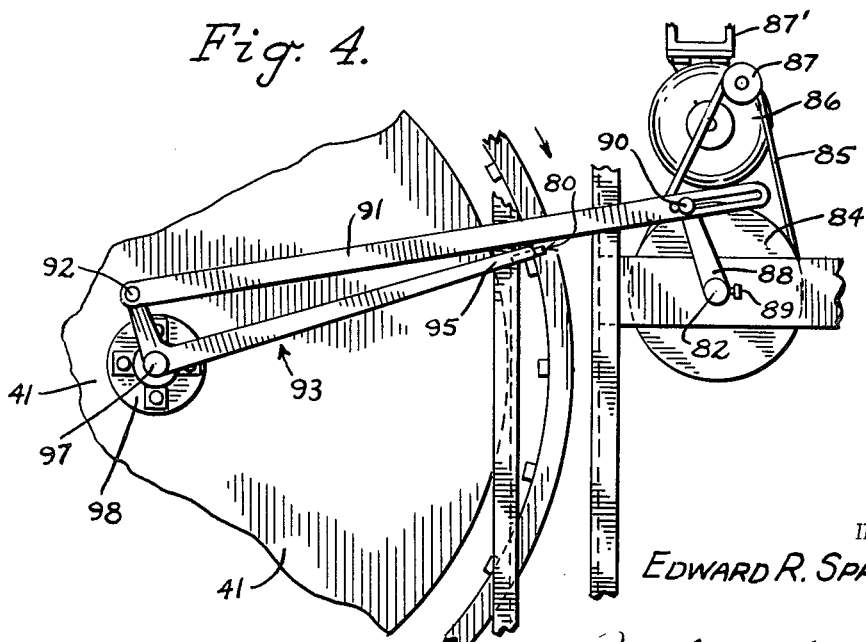
FIG. 4 is an enlarged fragmentary vertical section, substantially on the line 4—4 of FIG. 2.

Both conveyors 55 and 65 are retained in position with respect to the outer and inner faces of the upstanding wall 42 as by pluralities of spaced apart rollers 70 and 71, respectively (FIGS. 2 and 4), rotatably secured to the respective lower ring-shaped portions of the conveyors.

Means for supporting the outer conveyor 55 preferably consists of a plurality of trackways 75 which may be a series of spaced-apart horizontally-disposed brackets, bolted or otherwise rigidly secured to and extending outwardly from the wall 42. The relative positions of the trackways 75 with respect to the conveyor 55 is best shown in FIG. 2. A plurality of rollers 76, rotatably supported by the lower ring-shaped portions of the conveyors, extend downwardly on horizontal axes to contact the upper surface of the trackways 75 and the corresponding trackway 77 within the freezing compartment zone 44. The trackway 77 may be a horizontal partition wall secured as by bolts to the upstanding wall 42.

Means for step-by-step rotation of the two conveyors 55 and 65 are best shown in FIGS. 1–4 inclusive. Supported partly by the wall 42, as by the bearing arm 80, which projects outwardly therefrom, and partly by a bearing 81 carried by a partition wall 81′ of the housing 20, which partition wall provides a bearing, is a vertical shaft 82, and fixedly secured to the lower end portion of the shaft 82, as by a set screw 83, is a horizontal pulley 84, about which is trained a belt 85, rotated as by any suitable means such as an electric motor 86, by way of the takeoff 87. Of course without invention a sprocket, sprocket chain and gearing may be substituted for the pulley, belt and takeoff. The motor 86 may be rigidly supported by the bracket 87′ (FIG. 1).

The last-named means referred to above also includes a horizontal arm 88 (FIG. 4) rigidly secured at one end to the lower end portion of the shaft 82, as by a set screw 89. The other end portion of the arm 88 is pivotally connected, as at 90, to the slotted end portion of an elongate connecting rod 91 so that there is sliding movement between the arm 88 and connecting rod 91. The other end portion of the connecting rod 91 is pivotally connected, as at 92, to the shorter end portion of a rocker arm 93, while the outer end part 95 of the longer portion of the rocker arm is operatively connected to the conveyor 55 for step-by-step rotation of the conveyor. The elbow formed at the juncture of the longer and shorter parts of the rocker arm 93 is connected to the vertical shaft 97 which rotates in bearings 98 secured to the bottom wall 41. The longer arm portion of the rocker arm has an upwardly-extending outer end part 99 (FIGS. 2 and 10) which carries the trigger mechanism of the stepping means 105, next to be described.

The trigger means 106 is adapted to contact, one after another, a plurality of spaced-apart arms 100 (FIGS. 2 and 10) secured to and extending downwardly from the ring-shaped lower portion 57 of the conveyor 55.

The stepping means 105 associated with the arms 100, one by one, comprise a trigger mechanism, best shown in FIGS. 5 and 11, which is mounted on the upper end part 99 of the rocker arm 93, and provides a trigger 106, pivoted at 107 at the extremity of the part 99 as by conventional pivot means and is spring biased as at 108 to normally maintain a vertical position, as in full lines in FIG. 10, but will assume the position shown in dot-and-dash lines in order to allow passage of the arms 100. The trigger will then reassume its erect position. Of course, the movement of the rocker arm in conjunction with the trigger contacting the arms 100 effects the step-by-step rotation of the conveyor 55.

With reference now to the step-by-step rotation of the conveyor 55 this is preferably effected by means of a plurality of spaced-apart horizontally-extending arms 110, secured to the ring-shaped portion 57′ positioned substantially as shown in FIG. 2, associated with the arm 111 (FIGS. 2 and 5), the inner end portion of which is secured to the shaft 97 as by set screw 112. At the outer end portion of the arm 110 is a resilient element 113 (FIG. 11) which is preferably of steel. The element 113 normally projects outwardly with its longitudinal axis substantially normal to the longitudinal axis of the arm 110, but will slip over the arms 111 and engage it on the conveyor step movement stroke.

Figure 3:
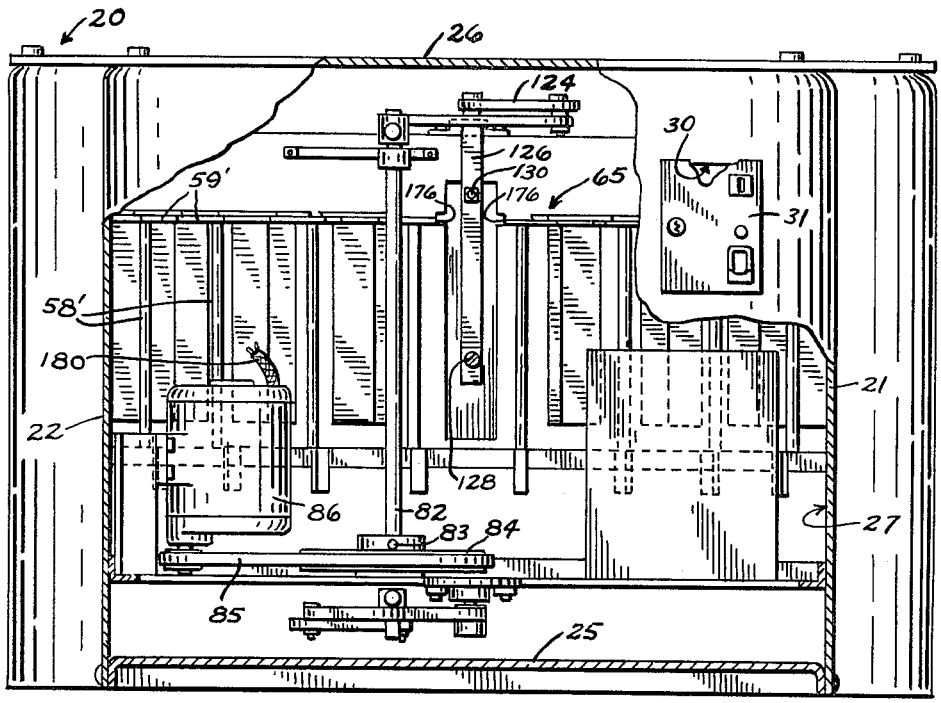
FIG. 3 is a view partly in front end elevation and partly in transverse vertical section.

Means 120 for opening and closing the closure or door 53 of the passageway 50, to and from the freezing compartment or zone 44, is best shown in FIGS. 1, 2 and 3. Of course, this means also operates to move or push the freezable-material containing receptacles and their support means, one by one from the conveyor 55 through the passageway 50 and onto the conveyor 65 for freezing of the freezable material and then moving the frozen material-containing receptacle and their support means 160, from the conveyor 65 through the passageway and onto the conveyor 55 for operation thereon by the receptacle severing means 170 to be later detailed. Carried by the shaft 82, above the bearing arm 80, is a horizontal arm 121 secured at one end portion, as by a set screw 122 to the shaft and with its other end portion pivoted, as at 123 to the slotted end portion of an elongate arm 124, so that there is play in the pivoted connection, which arm 124 is pivoted as at 125 to the inner end portion of a reciprocating rod 126 retained in spaced-apart slideways 127 secured to the top wall 43. The outer end portion of the rod 126, beyond the outermost slideway, projects downwardly, in engagement with the outer face of the upstanding wall 42 of the heat-insulating walls 41. At its lower end portion the downwardly-projecting end portion of the reciprocating rod 126 is secured as by the screw 128 to the closure or door 53, so that reciprocation of the rod will open or close the latter, in synchronization with step-by-step movements of the conveyors 55 and 65. In connection with the moving of a freezable material-containing receptacle 150 and its support 160 from the conveyor 55 and through the passageway 50 and onto the conveyor 65, the closure or door 53 functions as a pusher but when it moves the frozen material-containing receptacle and its support from the conveyor 65 through the passageway and onto the conveyor 55, it functions as a puller, since there is provided a hook member 130 (FIG. 2) with a part of its substantially straight end portion extending through the opening 54 and projecting from the inner face of the door or closure adjacent the upper end portion thereof, into the freezing compartment or zone with the bill portion of the hook extending downwardly, and the horizontal portion of the hook being above the horizontal planes of the receptacles within the freezing zone or compartment, as may be appreciated in FIG. 2. With the door or closure 53 in a closed position, the entire hook member 130 is out of contact with any frozen material-containing receptacle or its support.

Supported, as by the top wall 43 (FIG. 2) upon the brackets 135 is means 136 to introduce a freezing medium to the freezing zone or compartment. The means 136 may include refrigerating coils or elements of a conventional refrigeration unit 137, such as a two horsepower, low back-pressure one, with forced air supply, operated, for example, electrically by power conductor 138. Freezing fluid conducting means 139 extend through the walls of the freezing compartment or zone 44 and are operatively connected with the unit 136.

For the electric motor 86, I prefer to provide one with a conventional speed reduction means. For example, one complete revolution of the shaft 52 may take place in substantially 40 seconds and, due to the interaction of the parts operatively connected with the shaft, a 90° revolution thereof will initially cause opening of the door or closure 53, the next 90° revolution will rotate the conveyors 55 and 65 one step to place a receptacle 150 of freezable material and its support means 160 in the plane of the door 53 and open passageway 50; the next 90° revolution will cause the door to close, pushing the receptacle and its support means off the conveyor 55, through the passageway and onto the conveyor 65, and the final 90° revolution of the shaft will rotate the conveyors so that the receptacle and support means on the conveyor 65 will move away from the horizontal plane of the passageway, and there will also be no receptacle and its support upon the conveyor 55 in the path of the door or closure as it opens, whereupon the cycle of quarter (or 90°) revolutions of the shaft 52 will recommence.

The receptacles or bags 150, herein referred to generally as "receptacles" are constructed and arranged to receive the freezable material B. They are preferably moulded or otherwise shaped from plastic material and may be provided in various shapes and sizes. By way of example, a receptacle 150 is shown in FIG. 6 and others in other of the views and comprises a body portion of side wall 151 and bottom wall 152 with an upwardly-extending neck 153 defining a mouth 154. Preferably a conventional plastic material is provided which will allow for expansion of the freezable material during freezing thereof, but other material than plastic may be employed.

Closures 155 for the receptacles 150 may be plugs or discs of any suitable material, such as hardened plastics. The peripheries of the closures are slightly bevelled inwardly from upper to lower faces thereof, not only to close the mouths of the receptacles but also to provide a clamping effect, in conjunction with the support means 160 next to be described. It will be noted that the level of the freezable material B within the receptacle 150 of FIG. 1 is below the bottom face of the closure for a purpose later described.

A plurality of support means 160 for detachably securing the receptacles in spaced-apart relationship upon the conveyors 55 and 65, thus providing supporting surfaces, are best shown in FIGS. 6, 7 and 9, but also elsewhere in the drawings, and each comprises a disc portion 161 with depending flange 162, defining a circumferential shoulder 163 and a central bevelled opening 164. The shoulder 163 is adapted to slide over portions of the faces 61 of two adjacent segmental sections 59 or 59' with the flange 162 extending into the opening 60 or 60' between the two adjacent sections 59 or 59', but preferably slightly out of contact therewith. The receptacles 150 are attached to the means 160 preferably at the station D by the operator.

Upon filling the receptacles 150 with the freezable material B to slightly below the neck, as may be seen in FIG. 6, the operator will lower each receptacle through the central bevelled opening 60 and, supporting each receptacle, such as by the hand upon the bottom wall 152 of the receptacle and the neck 153 positioned substantially as in FIG. 6, the operator will insert the closure 155. Being bevelled, the closure will press the neck against the bevelled opening of the depending flange 162 and not only close the mouth but also retain the receptacle suspended by the means 160. The receptacle 150 and means 160 will then travel to a position at the passageway 50 for sliding from the conveyor 55 through the passageway and upon the conveyor 65.

Receptacle severing means 170 is best shown in FIGS. 8 and 9. Preferably, the actual severing means is a sharp blade 171 with its cutting edge 172 facing toward the conveyor 55, as in FIG. 8, and movable in paths toward and away from the conveyor, the paths being substantially horizontal and intersecting the frozen material-containing receptacles 150 carried by the conveyor 55 just after they have been discharged upon the conveyor 55 and moved out of the horizontal plane of the passageway and closure.

The knife is fixedly secured to one arm 173 of a substantially U-shaped yoke 174, as in FIG. 8, and with the outer arm 175 of the yoke fixedly secured to the door or closure 53 to extend outwardly therefrom. Specifically, the horizontal plane of the blade's cutting edge 172 will intersect a frozen material-containing receptacle 150 just below the closure 151 and flange 162 and above the level of the frozen material, so as to sever that portion of the receptacle (the lower portion) which contains the frozen material, from the support means 160, whereupon the lower portion and its frozen material C will drop by gravity into the discharge compartment 34 for storage and to be removed by a purchaser or attendant. Any suitable means may be employed, operatively connected between a conventional check-controlled means 140 and the door 33, whereby the door may be opened upon the deposit of a check, so that frozen material may be removed from the machine. However, the actual means 140 for control of the door 33 forms no portion of this invention.

Referring to FIGS. 3 and 8, it will be noted that the closure 54 is provided with two short horizontal flanges 175 which extend outwardly from its opposite ends. These flanges are constructed and arranged to slide into a pair of recesses 176 which extend into the wall 42 at the passageway 50. The recesses are necessary to accommodate the outer portion of the flange 161 (FIG. 6).

From the power lines (not shown), a suitable electric conductor 180 (FIG. 3) extends to the motor 86 and a conventional electric switch (not shown) may be interposed in the conductor and disposed in the compartment 27 adjacent the door 29 for operation by the operator.

While descriptions of the operation of portions of the machine A have been detailed in connection with the descriptions of such portions for a better understanding thereof, the operation of the machine embodies the following: The operator at the station D fills the receptacles 150 with freezable material, such as water, to a level substantially as shown in FIGS. 6 and 9 and inserts the receptacles in the support means 160, and corks them with the closures 155. In the example shown, the conveyor 55 rotates counterclockwise and, as the first receptacle and its support means approaches the door or closure 53, the latter opens and the receptacle and its support means moves into the horizontal planes of the passageway 50 and door. The latter then closes, pushing the receptacle and its support means off the conveyor 55, through the passageway and onto the conveyor 65 which then rotates one step so that the next opening between two of its segmental sections 59' is within the horizontal plane of the passageway to receive the next receptacle and its support means pushed onto the conveyor 65. Of course rotation of the conveyor 65 will eventually bring a receptacle containing frozen material and its support means to the plane last mentioned and the opening of the door 53 will draw them through the passageway and onto the conveyor 55. The conveyor 55 will then move so that this receptacle and its support means is out of the horizontal plane of the passageway, whereby the conveyor 55 will have moved a receptacle of freezable material into this plane for the door to push therefrom, through the passageway and onto the conveyor 65. As the door closes, its operative connection with the receptacle severing means 170 will cause the blade 171 to slice the neck 153 of the frozen material-containing receptacle 150 as has been described, whereupon the severed receptacle and its contents, but not its support means, will fall by gravity into the discharge compartment 34.

Various changes may be made to the form of invention herein shown and described without departing from the spirit of the invention or scope of the claims.

What is claimed is:

1. A machine for freezing units of freezable materials, said machine including a support; heat insulating walls, including a top wall and an upstanding wall defining a freezing zone and carried by said support, said upstanding wall having a passageway therethrough providing an outer mouth and an inner mouth; combined closure and mover means comprising a door for said closure movable in a substantially horizontal path; a first substantially horizontally-disposed ring-shaped conveyor encircling said upstanding wall and spaced therefrom and closely adjacent said outer mouth and intersected by the horizontal plane of said passageway and path; a plurality of receptacles each having a freezable-materials receiving mouth; first support means for detachably securing said receptacles in spaced-apart relationship upon said conveyor to be positioned, upon rotation of said conveyor, one after another, within said horizontal plane of said passageway; a substantially horizontally-disposed second ring-shaped conveyor, said second ring-shaped conveyor being disposed within said freezing zone closely adjacent the inner face of said upstanding wall and intersected said plane of said passageway; second support means for detachably securing said receptacles to said second ring-shaped conveyor in spaced-apart relationship to be positioned upon rotation of said second ring-shaped conveyor within said horizontal plane of said passageway; movement imparting means carried by said support and top wall for rotating said ring-shaped conveyors in step-by-step movements thereof; means for horizontally opening said door and for horizontally closing said door; synchronizing means carried by said support for synchronizing the opening of said door upon one of said receptacles supported by said first support means approaches said door and for closing said door to push the last-named receptacle from the support means therefor, through said passageway and for support by one of said second support means and for opening siad door again for removing a frozen material-containing receptacle from said second conveyor to said first conveyor; means carried by said support for synchronizing the rotation of said second ring-shaped conveyor to position a receptacle, which is supported by one of said second support means, at said inner mouth, said door being provided with means to pull said second receptacle, upon opening of said door, from said second conveyor and through said passageway and onto said first conveyor and for support by an unoccupied first support means positioned on said first ring-shaped conveyor to receive it; means to start and stop rotation of said first and second ring-shaped conveyors; and means for selectively introducing a freezing medium to said freezing zone, carried by said support.

2. A machine according to claim 1 characterized in that said first substantially horizontally-disposed ring-shaped conveyor comprises a lowermost ring-shaped portion, an uppermost composite portion comprising a plurality of spaced-apart segmental sections for releasably supporting said receptacles and support means, and spaced-apart rigid members connecting said uppermost and lowermost portions.

3. A machine according to claim 1 characterized in that said first substantially horizontally-disposed ring-shaped conveyor comprises a lowermost ring-shaped portion, an uppermost composite portion comprising a plurality of spaced-apart segmental sections for releasably supporting said receptacles and support means, and spaced-apart rigid members connecting said uppermost and lowermost portions, said segmental sections having end faces, with the end faces of one section spaced from the end faces of the next adjacent sections, providing spaces for the accommodation of said receptacles upon said first conveyor.

4. A machine according to claim 1 characterized in that said second substantially horizontally-disposed ring-shaped conveyor comprises a lowermost ring-shaped portion, an uppermost composite portion comprising a plurality of spaced-apart segmental sections for releasably supporting said receptacles and support means, and spaced-apart rigid members connecting said uppermost and lowermost portions.

5. A machine according to claim 1 characterized in that said second substantially horizontally-disposed ring-shaped conveyor comprises a lowermost ring-shaped portion, an uppermost composite portion comprising a plurality of spaced-apart segmental sections for releasably supporting said receptacles and support means, and spaced-apart rigid members connecting said uppermost and lowermost portions, said segmental sections having end faces, with the end faces of one section spaced from the end faces of the next adjacent sections, providing spaces for the accommodation of said receptacles upon said second conveyor.

6. A machine according to claim 1 characterized in that said movement-imparting means includes a trigger, and a plurality of spaced-apart projections extending outwardly from and rigid with said conveyors and engageable by said trigger to step-rotate said first ring-shaped conveyor.

7. A machine according to claim 1 characterized in that said movement-imparting means includes a resilient arm, and a plurality of spaced-apart projections extending outwardly from and rigid with said conveyors and engageable by said resilient arm to step-rotate said second ring-shaped conveyor.

8. A machine according to claim 1 characterized in that said door is provided with puller means to engage and pull said frozen material-containing receptable and its support from said second conveyor, through said passageway and onto said first conveyor.

9. A machine according to claim 1 characterized in that said door is provided with puller means to engage and pull said frozen material-containing receptacle and its support from said second conveyor, through said passageway and onto said first conveyor, said puller means comprising an angled member with one portion thereof rigid with said door and another portion thereof constructed and arranged to contact a receptacle disposed in the horizontal plane of said passageway and pull the last-named receptacle from said second conveyor as said door opens.

10. A machine according to claim 1 characterized in that said machine includes means to detach a receptacle from said first conveyor, the last-named means being operable only after a receptacle is moved from said second conveyor onto said first conveyor, and is moved by said first conveyor.

11. A machine according to claim 1 characterized in that said machine includes means to detach a receptacle from said first conveyor, the last-named means being operable only after a receptacle is moved from said second conveyor onto said first conveyor, and is moved by said first conveyor from the horizontal plane of said passageway.

12. A machine according to claim 10 characterized in that said last-named means is carried by said door.

13. The steps in the method of freezing units of freezable material which steps comprise confining a unit of freezable material in a first portable receptacle at a station; moving said receptacle to a location adjacent the outer mouth of a passageway closed by a movable closure, said location being outside the path of movement of said closure; moving said closure away from said mouth; moving said receptacle to a second location within both the closing path of said closure and within the horizontal plane of said passageway; utilizing the closing movement of said closure to push said receptacle into said mouth and passageway and into a freezing zone for said freezable material; freezing said freezable material; meanwhile confining a second unit of freezable material in a second receptacle at said station; moving said second receptacle to said location adjacent said outer mouth and outside said path; moving said closure away from said mouth and utilizing the last-named movement to draw said first receptacle through said passageway and out of said mouth; moving said first receptacle away from said mouth and path; moving said second receptacle to said second location; utilizing the closing movement of said closure to push said second receptacle into said mouth and passageway and into said freezing zone; and freezing the material in said second receptacle while in said freezing zone.

14. The steps in the method of freezing units of freezable material which steps comprise confining a unit of freezable material in a first portable receptacle at a station; moving said receptacle to a location adjacent the outer mouth of a passageway closed by a movable closure, said location being outside the path of movement of said closure; moving said closure away from said mouth; moving said receptacle to a second location within both the closing path of said closure and within the horizontal plane of said passageway; utilizing the closing movement of said closure to move said receptacle into said mouth and passageway and into a freezing zone for said freezable material; freezing said freezable material; meanwhile confining a second unit of freezable material in a second receptacle at said station; moving said second receptacle to said location adjacent said outer mouth and outside said path; moving said closure away from said mouth and utilizing the last-named movement to move said first receptacle through said passageway and out of said mouth; moving said first receptacle away from said mouth and path; moving said second receptacle to said second location; utilizing the closing movement of said closure to move said second receptacle into said mouth and passageway and into said freezing zone; and freezing the material in said second receptacle while in said freezing zone.

15. The steps in the method of freezing units of freezable material which steps comprise confining a unit of freezable material in a first portable receptacle at a station; attaching the filled receptacle to a support; moving said receptacle and support to a location adjacent the outer mouth of a passageway closed by a movable closure, said location being outside the path of movement of said closure; moving said closure away from said mouth; moving said receptacle and support to a second location within both the closing path of said closure and within the horizontal plane of said passageway; utilizing the closing movement of said closure to push said receptacle and support into said mouth and passageway and into a freezing zone for said freezable material; freezing said freezable material; meanwhile confining a second unit of freezable material in a second receptacle at said station; attaching the filled second receptacle to a support; moving said second receptacle to said location adjacent said outer mouth and outside said path; moving said closure away from said mouth and utilizing the last-named movement to draw said first receptacle through said passageway and out of said mouth; moving said first receptacle away from said mouth and path; moving said second receptacle and support to said second location; utilizing the closing movement of said closure to push said second receptacle into said mouth and passageway and into said freezing zone; and to effect detachment of said first receptacle from its support; and freezing the material in said second receptacle while in said freezing zone.

No references cited.

ROBERT A. O'LEARY, *Primary Examiner.*